A. Merrell,
Spoke Machine,
Nº 10,507.
Sheet 1- 2 Sheets.
Patented Feb. 7. 1854.
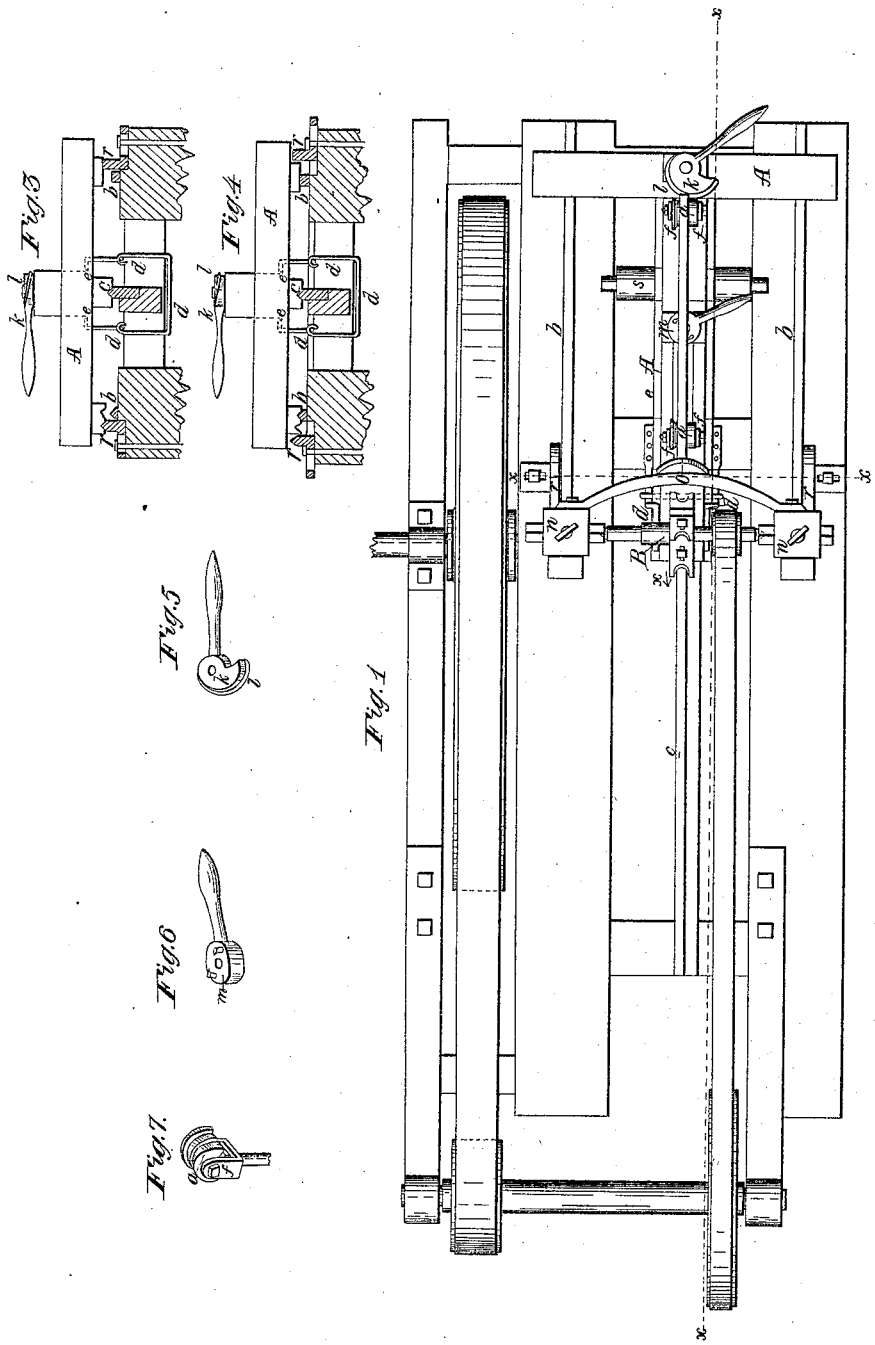

A. Merrell,
Spoke Machine.
N°10,507.   Patented Feb. 7, 1854.
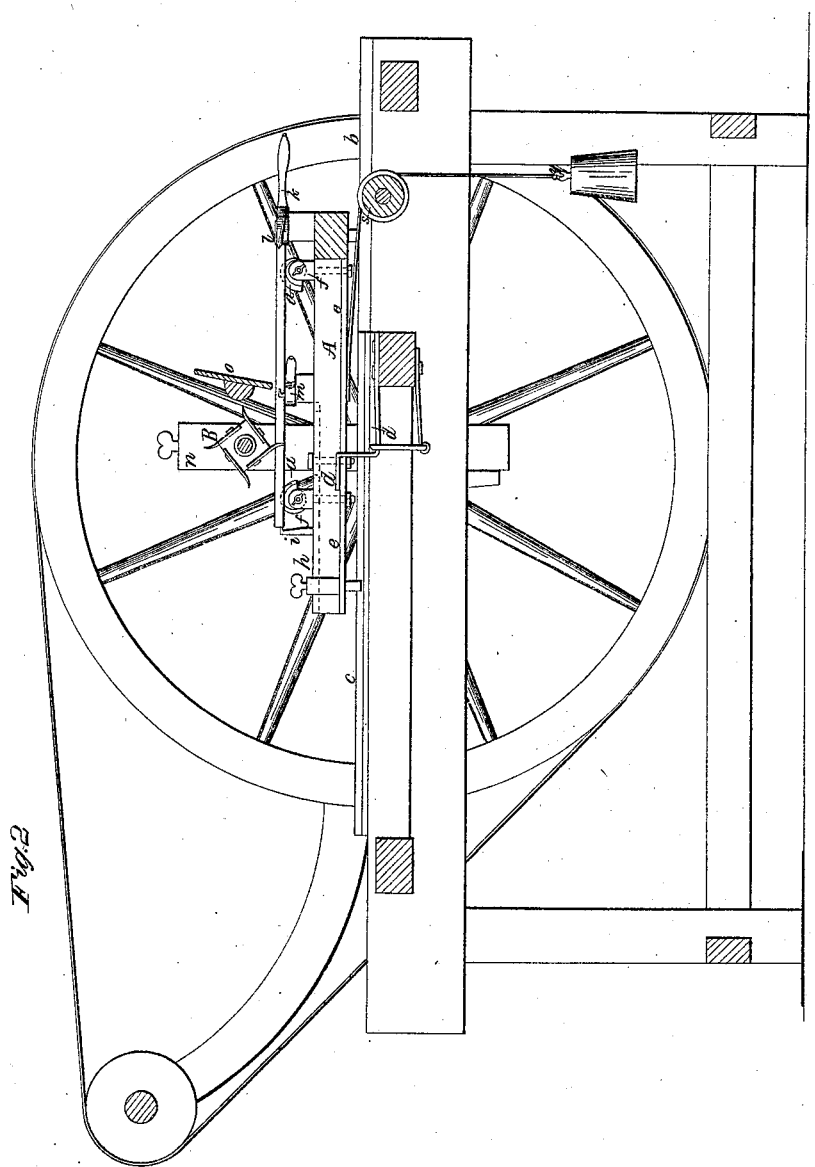

UNITED STATES PATENT OFFICE.

ANSEL MERRELL, OF NEW BEDFORD, MASSACHUSETTS, ASSIGNOR TO JNO. M. IRVINE AND A. MERRELL.

MACHINE FOR DRESSING SPOKES.

Specification of Letters Patent No. 10,507, dated February 7, 1854.

*To all whom it may concern:*

Be it known that I, ANSEL MERRELL, of New Bedford, in the county of Lawrence and State of Pennsylvania, have invented certain new and useful Improvements in Machines for Dressing Wooden Spokes, of which the following is a full, clear, and exact description, reference being had to the accompanying drawings, which form part of this specification, and in which—

Figure 1 represents a top view of my improved spoke dressing machine; Fig. 2 a vertical longitudinal section taken at the line *x x* of Fig. 1; Fig. 3 a vertical transverse section at the line # # of Fig. 1, showing the position of the carriage with respect to the risers adjacent to the rails for elevating the carriage to give the point of the spoke the proper taper; Fig. 4 a similar view, but showing the risers clear of the carriage and the latter resting upon the indented portion of the rails to produce a protuberance on the spoke; Fig. 5 a view in perspective of a combined clamp and dog for holding the end of the spoke; Fig. 6 a similar view of a gripping lever for holding the middle of the spoke, and Fig. 7, a similar view of a cam to support the spoke at the proper elevation.

As the strength of a wheel depends in a great measure upon the proper and regular form of its spokes, numerous attempts have been made to construct machines for cutting and shaping wooden spokes, and for the purpose of expediting the formation of them; but most or all of these machines have been more or less defective in the devices for holding and shaping the spokes, as well as in giving them that neat and regular finish which it is necessary for them to have.

To remove these defects, and to construct a machine capable of dressing spokes of various sizes and shapes of a regular taper, and with a neat finish is the object of my invention.

In the machine represented in the accompanying drawings the piece of wood from which the spoke is to be made is seated at either end on a cam prop (*a*) connected with a sliding carriage or frame (A). This sliding carriage serves to convey the piece of wood under a rotary cylinder (B), of cutting knives which dress and form the spoke as will presently be described.

The sliding carriage (A) travels on rails or ways (*b* and *c*), secured to the top of a suitable frame, it is furnished with bearings that span the rails and serve to guide it in a straight course under the rotary cutter; springs (*d*), are attached to the frame of the machine in a course or line under the rotary cutter; these springs embrace a rib (*e*), along either side of the carriage for the purpose of keeping the carriage steady on the rails (*b* and *c*), and to prevent it from being lifted by the action of the cutters; these springs may be adjusted by means of set screws or otherwise. These springs yield sufficiently to allow the carriage to rise and fall as required to conform to the curvatures of the rail. The cam supports (*a*) have their bearings in boxes (*f*), and are so arranged and fitted that they may be adjusted for the purpose of accommodating different sizes of spokes, and may be swiveled or slightly turned to adjust them to inequalities in the rough stick. These cam supports are turned and set to the required pitch so as to elevate one end of the stick for the purpose of increasing the taper in the spoke. These supports have a flange on one side or end against which the piece of wood is placed: the forward cam is connected with a slide (*h*), in the carriage so that it may slide and set at any required distance from the back stationary support to suit various lengths of spokes. A clawed dog (*i*), projects upward from the slide in advance of the forward cam. This clawed dog serves to stick into one end of the stick and hold it steady on the supports. The piece of wood is forced up against the dog, and also held at its opposite end by a cam lever (*k*); the cam of this lever has a screw thread (*l*), on its edge inclining downward from the short to the long radius of the cam. This screw thread serves to cut into the end of the piece of wood for the purpose of holding the back end of the spoke in the manner of a dog, and also to press it down firmly upon the supports to prevent it from jumping or springing up during the cut. By this combination and arrangement of the clawed sliding dog and the screw threaded cam lever or dog, the spoke, whatever its size may be expeditiously and firmly gripped to its place; but in order to avoid more effectually all vibration in the spoke while under the operation of the cutter, it may be held laterally or centrally by a grip lever (*m*), which has claws projecting from it, so that on turning the lever the claws stick into either side of the stick and hold it firmly. The knives of the rotary cutter head (D) are, in shape, the counterpart of the sides of the spoke which they are required to dress; the spindle or shaft which carries the cutter head is adjustable lengthwise for the purpose of setting the knives truly over the spoke.

Rotary motion is communicated to the cutter head in the direction indicated by arrow ($x$), by pulleys and belts, or in any other suitable manner. The posts ($n$), which support the rotary cutter head shaft, and its adjusting devices are fitted to the frame of the machine so that they may be raised or lowered to vary the distance of the knives from the carriage to adapt them to dressing spokes of different sizes.

A shield ($o$), is attached to a brace connecting the two posts ($n$), to prevent the chips made by the knives from striking the attendant. The piece of wood for a spoke being seated and gripped as described on the cam supports, its rear end inclining upward, the carriage is pushed along the rails under the cutters, which have previously been set in motion so as to cause the knives to round and taper one side of the spoke, the cut being increased in depth as the carriage approaches the forward extremity of its range of motion by rising guides ($r$), that project above the rails ($b$), upon which the carriage mounts to give the requisite shape and reduction of the spoke near and at its point. The same operation is repeated for the opposite side of the spoke. The rising guides ($r$), are attached to slides which admit of the risers being set to one side and clear of the bearings of the carriage, and the rails ($b$), are gradually indented or reduced at their front ends, so that by only forming the edges of the spoke as described for a portion of its length and afterwards reversing its position on the cam supports and sliding the risers clear of the carriage, the heels of the carriage when brought up to the indentations in the rails will drop and by gradually lowering the spoke cause the knives to give the usual enlargement to the spoke at their shoulder where they meet the hub. A weight attached to a strap connected with the carriage and passing over a pulley ($s$), serves to draw the carriage back after the cut has been completed. Thus it will be seen that by the adjusting and gripping arrangements provided a spoke of any desired dimensions and taper may be dressed.

What I claim as new and useful, and desire to secure by Letters Patent is—

The combination of the cam lever having a screw thread thereon, with the adjustable dogs and supports as herein set forth whereby the rough stick or block may be held firmly at any required angle to the carriage, and at a variable distance below the knives in order that it may dress spokes of variable taper, and of different lengths and thicknesses.

In testimony whereof, I have hereunto subscribed my name.

ANSEL MERRELL.

Witnesses:
 A. W. ROGERS,
 WM. PORTER.